US011875278B2

United States Patent
Horgan et al.

(10) Patent No.: US 11,875,278 B2
(45) Date of Patent: Jan. 16, 2024

(54) DOOR LOCK FAULT DETECTION

(71) Applicant: Johnson Controls Tyco IP Holdings LLP, Milwaukee, WI (US)

(72) Inventors: Donagh S. Horgan, Cork (IE); Eamonn J. O'Toole, Ballincollig (IE); Jane A. Delaney, Cork (IE); Andrew J. Keane, Killarney (IE)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 432 days.

(21) Appl. No.: 16/803,775

(22) Filed: Feb. 27, 2020

(65) Prior Publication Data

US 2021/0271996 A1 Sep. 2, 2021

(51) Int. Cl.
  *G06N 7/01* (2023.01)
  *G06N 20/00* (2019.01)
  *G06N 5/04* (2023.01)
  *G08B 21/18* (2006.01)
  *G07C 9/00* (2020.01)
  *H04L 12/18* (2006.01)
  *G08B 7/06* (2006.01)

(52) U.S. Cl.
  CPC .............. *G06N 7/01* (2023.01); *G06N 5/04* (2013.01); *G06N 20/00* (2019.01); *G07C 9/00904* (2013.01); *G08B 21/18* (2013.01); *G08B 7/06* (2013.01); *H04L 12/1895* (2013.01)

(58) Field of Classification Search
  CPC .......... G06N 7/005; G06N 5/04; G06N 20/00; G07C 9/00904; G07C 9/00896; G07C 9/38; G07C 2209/08; G07C 2209/62; G07C 9/00571; G08B 21/18; G08B 7/06; H04L 12/1895
  See application file for complete search history.

(56) References Cited

U.S. PATENT DOCUMENTS

| 2006/0106572 A1* | 5/2006 | Eichblatt | G05B 23/0294 702/181 |
| 2011/0016971 A1* | 1/2011 | Yulkowski | G07C 9/00571 73/493 |
| 2011/0202227 A1* | 8/2011 | Zhang | B60W 50/0097 714/E11.029 |

* cited by examiner

Primary Examiner — James J Yang
(74) Attorney, Agent, or Firm — Foley & Lardner LLP

(57) ABSTRACT

A building security system of a building including one or more memory devices configured to store instructions causing one or more processors to receive door lock data collected from one or more sensors for one or more doors within the building indicating operation of the one or more doors, select a period for which the door lock data was collected, select a first door from the one or more doors of the building for which data is collected, and identify segments of the data indicating activity of the door. The instructions also apply a model to segments of the data indicating activity of the first door, compute a probability metric for each segment of the data, compute a combined probability score for the first door based on the computed probability metrics, and classify the first door as normally functioning or malfunctioning by comparing the combined probability score to a threshold.

21 Claims, 7 Drawing Sheets

DOOR LOCK FAULT DETECTION

BACKGROUND

The present disclosure relates generally to security systems of buildings. The present disclosure relates more particularly to a building security system for monitoring, analyzing, and/or operating the building security system based on collected data.

Building security systems commonly have multiple doors configured to restrict access to specific areas within a building. For example, users may be required to provide some form of credentials that, upon verification, permit access through a secured door and into a restricted area. Accordingly, it is critical that restricted areas remain secure and are only accessed by those with proper credentials. However, doors are often held open, pushed open, forced open, or fail to lock correctly thus preventing a security to risk to any secured areas. In order to mitigate such risk, minimizing or preventing such events is desirable. However, such mitigation of risk is often cost and/or resource prohibitive in that personnel cannot be supplied to constantly monitor all access of secure areas through doors.

SUMMARY

At least one implementation of the present disclosure is a building security system of a building, the building security system having one or more memory devices configured to store instructions that, when executed by one or more processors, cause the one or more processors to receive door lock data collected from one or more sensors for one or more doors within the building indicating operation of the one or more doors, select a period for which the door lock data was collected, select a first door from the one or more doors of the building for which data is collected, and identify segments of the data indicating activity of the door. The instructions also cause the one or more processors to apply a generated model to the identified segments of the data indicating activity of the first door, compute a probability metric for each identified segment of the data, compute a combined probability score for the first door based on the computed probability metrics for each identified segment of the data, wherein the combined probability score indicates normal function or malfunction of the first door, and apply a threshold to the combined probability score for the first door to classify the function of the first door by comparing the combined probability score to a threshold.

In some embodiments, the instructions are configured to cause the one or more processors to classify the first door as normally functioning or malfunctioning by comparing the combined probability score to the threshold.

In some embodiments, the instructions are configured to cause the one or more processors to generate an alert indicating that the first door is classified as malfunctioning responsive to the combined probability score exceeding the threshold.

In some embodiments, the applied threshold is computed based on at least one of historical system data or user preferences.

In some embodiments, the combined probability score is a mean probability score.

In some embodiments, different doors of the one or more doors of the building for which data is collected have different thresholds for classification as normally functioning or malfunctioning.

In some embodiments, the segments of the data indicating activity of the first door comprise door forced open events.

In some embodiments, the model is a two state model with a first state corresponding to normal functioning behavior of the first door and second state corresponding to malfunctioning behavior of the first door, wherein the applied model is specific to the selected door.

In some embodiments, the applied model is a Hidden Markov model.

In some embodiments, the first door lock data is received from a common database for the one or more doors within the building, the door lock data from a designated time period.

In some embodiments, the period for which the first door lock data was collected is be adjustable and can further be selected by a user.

Another implementation of the present disclosure is a method for door lock fault detection. The method can include receiving door lock data collected from one or more sensors for one or more doors within the building indicating operation of the one or more doors, selecting a period for which the door lock data was collected, and selecting a first door from the one or more doors of the building for which data is collected. The method can further include identifying segments of the data indicating activity of the first door, applying a generated model to the identified segments of the data indicating activity of the first door, computing a probability metric for each identified segment of the data, computing a combined probability score for the first door based on the computed probability metrics for each identified segment of the data, wherein the combined probability score indicates normal function or malfunction of the first door, and classifying the function of the first door by comparing the combined probability score to a threshold.

In some embodiments, the method further includes classifying the first door as normally functioning or malfunctioning by comparing the combined probability score to the threshold.

In some embodiments, the method further includes generating a maintenance alert for the first door for the combined probability score exceeding the applied threshold indicating that the door is classified as malfunctioning.

In some embodiments, the applied threshold is computed based on historical system data or user preferences.

In some embodiments, different doors of the one or more doors of the building for which data is collected have different thresholds for classification as normally functioning or malfunctioning.

In some embodiments, the segments of the data indicating activity of the first door comprise door forced open events.

In some embodiments, the applied model is a two state model with a first state corresponding to normal functioning behavior of the first door and second state corresponding to malfunctioning behavior of the first door, wherein the applied model is specific to the selected door.

In some embodiments, the applied model is a Hidden Markov Model.

In some embodiments, the door lock data is received from an access control system comprising a common database for the one or more doors within the building, the door lock data from a designated time period.

In some embodiments, the period for which the door lock data was collected is be adjustable and can further be selected by a user.

Another implementation of the present disclosure is a door lock fault detection system one or more computer-readable storage media having instructions stored thereon that, when executed by one or more processors, cause the one or more processors to implement operations comprising receiving door lock data collected from one or more sensors for one or more doors within a building indicating operation of the one or more doors, selecting a period for which the door lock data was collected, selecting a first door from the one or more doors of the building for which data is collected, identifying segments of the data indicating activity of the first door, applying a generated model to the identified segments of the data indicating activity of the first door, computing a probability metric for each identified segment of the data, computing a combined probability score for the first door based on the computed probability metrics for each identified segment of the data, wherein the combined probability score indicates normal function or malfunction of the first door, applying a threshold to the combined probability score for the first door to classify the first door as normally functioning as normally functioning responsive to the combined probability score being below the threshold and classifying the first door as malfunctioning responsive to the combined probability score being at or above the threshold, and generating an alert responsive to responsive to the combined probability score for the first door being at or above the threshold.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Building and HVAC System

Figure 1:
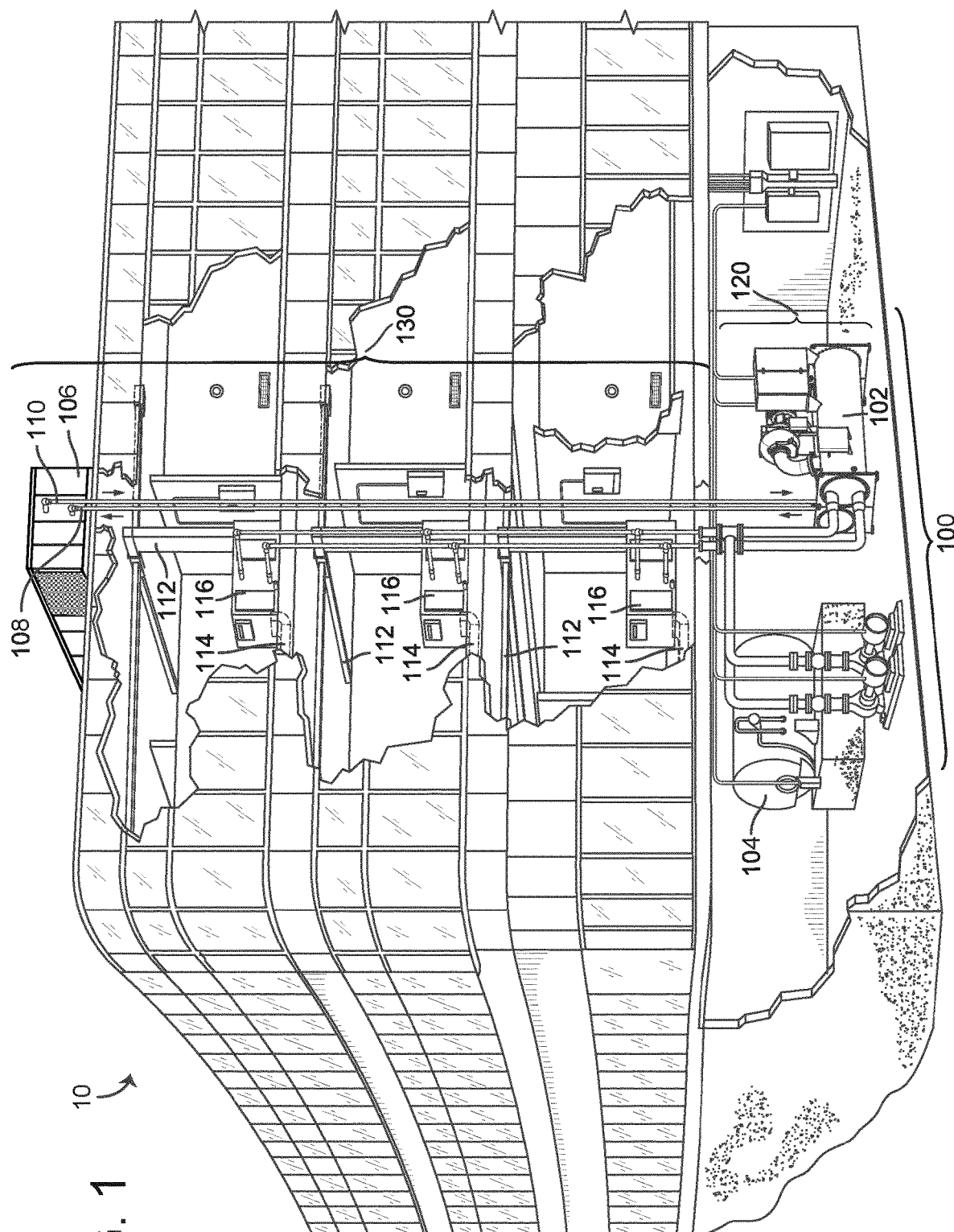
FIG. 1 is a drawing of a building equipped with a HVAC system, according to some embodiments.

Referring particularly to FIG. 1, a perspective view of a building 10 is shown. Building 10 is served by a BMS. A BMS, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
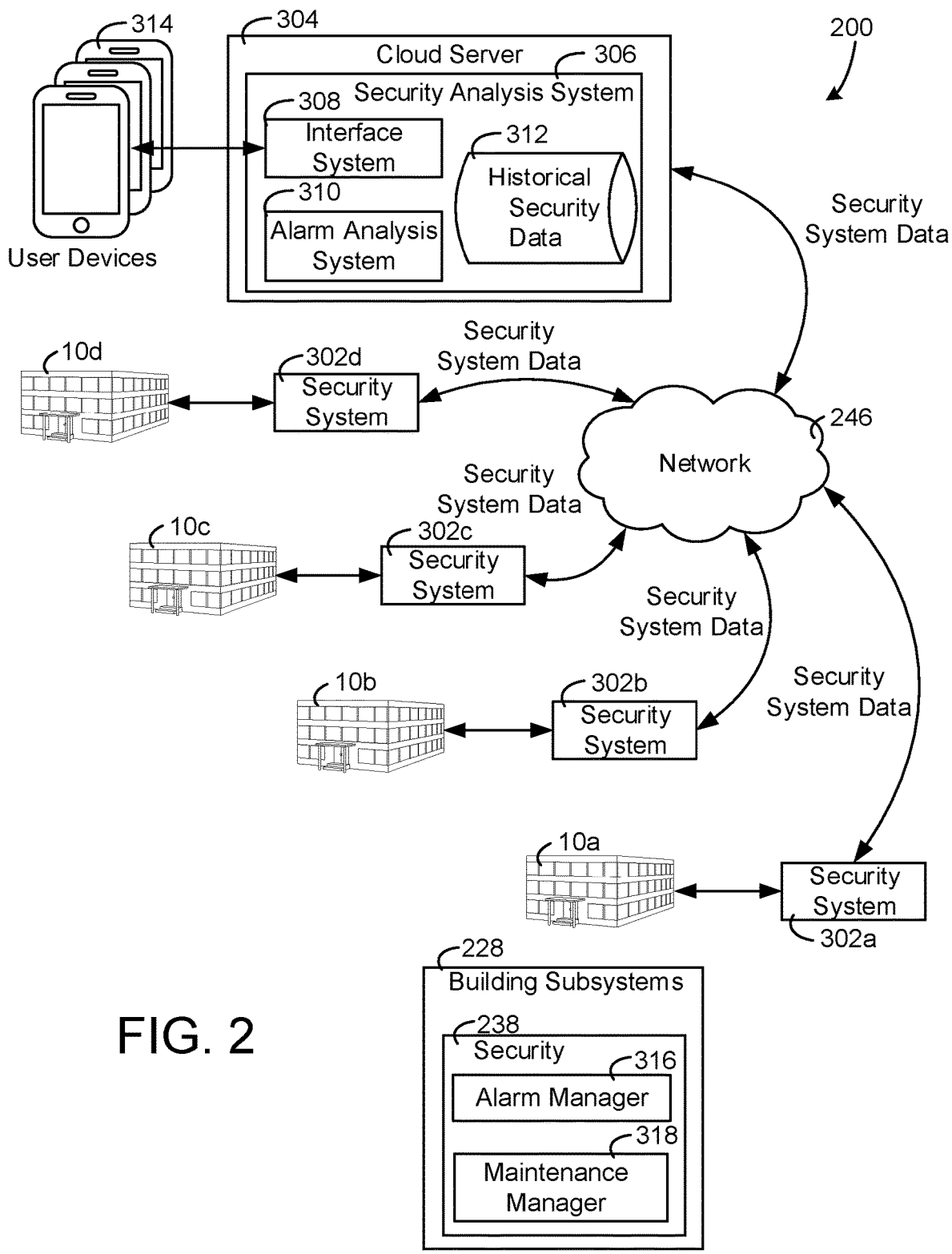
FIG. 2 is a block diagram of a security system which can be used in conjunction with the building of FIG. 1, according to some embodiments.

Referring now to FIG. 2, a security system 200 is shown for multiple buildings, according to an exemplary embodiment. The security system 200 is shown to include buildings 10a-10d. Each of buildings 10a-10d is shown to be associated with a security system 302a-302d. The buildings 10a-10d may be the same as and/or similar to building 10 as described with reference to FIG. 1. The security systems 302a-302d may be one or more controllers, servers, and/or computers located in a security panel or part of a central computing system for a building.

The security systems 302a-302d may communicate with various security sensors that are part of the building subsystems 228. Building subsystems 228 are shown to include a security subsystem 238, as shown in the exemplary embodiment of FIG. 2. Additionally, security subsystem 238 is shown to include an alarm manager 316 as well as a maintenance manager 318. In some embodiments, alarm manager 316 and maintenance manager are in communication with security systems 302a-302d so as to identify malfunctioning and/or faulty security mechanisms which may include, among other components, various doors. For example alarm manager 316 may be configured to generate an alarm to alert a user and/or operator of a security concern within buildings 10a-10d which may include faulty or malfunctioning doors as mentioned previously. Maintenance manager 318 can be configured to identify maintenance concerns relating to security systems 302a-302d as they pertain to buildings 10a-10d such as, for example, a door not properly operating and thus requiring maintenance to eliminate any security concern.

Each of buildings 10a-10d may be located in various cities, states, and/or countries across the world. There may be any number of buildings 10a-10d. The buildings 10a-10d may be owned and operated by one or more entities. For example, a grocery store entity may own and operate buildings 10a-10d in a particular geographic state. The security systems 302a-302d may record data from the building subsystems 228 and communicate collected security system data to the cloud server 304.

The cloud server 304 is shown to include a security system 306 that receives the security system data from the security systems 302a-302d of the buildings 10a-10d. The cloud server 304 may include one or more processing circuits (e.g., memory devices, processors, databases) configured to perform the various functionalities described herein. The processing circuits may be the same and/or similar to the processing circuit 204, the processor 206, and/or the memory 208 as described with reference to FIG. 2. The cloud server 304 may be a private server. In some embodiments, the cloud server 304 is implemented by a cloud system, examples of which include AMAZON WEB SERVICES® (AWS) and MICROSOFT AZURE®.

In some embodiments, the cloud server 304 can be located on premises within one of the buildings 10a-10d. For example, a user may wish that their security, fire, or HVAC data remain confidential and have a lower risk of being compromised. In such an instance, the cloud server 304 may be located on-premises instead of within an off-premises cloud platform.

The security system 306 may implement an interface system 308, an alarm analysis system 310, and a database storing historical security data 312, security system data collected from the security systems 302a-302d. The interface system 308 may provide various interfaces of user devices 314 for monitoring and/or controlling the security systems 302a-302d of the buildings 10a-10d. The interfaces may include various maps, alarm information, maintenance ordering systems, etc.

Security systems e.g., the security system 302a, can protect residential or commercial premises by implementing functionality e.g., intrusion detection, access control, video surveillance, and fire detection. In each case, sensors deployed at various locations in and around the building transmit data back to a central system for analysis, e.g., the security systems 302a-302d. In some instances, such data is further transmitted to an offsite location that serves as a monitoring center, e.g., the alarm analysis system 310. In either case, the sensor data can be analyzed to determine if a condition exists at the premises that requires attention by a security professional. For example, if a motion sensor detects that someone has entered a building at a time that the intrusion system is armed or if an access control system detects that a door is being forced open, that information is transmitted to the local or remote monitoring center which can deploy security guards or call the police.

Unfortunately, such security systems for detecting alarms (e.g., a fire, an intrusion, etc.) may not be foolproof. If a sensor is going bad or requires maintenance, it may produce spurious data falsely indicating that there has been a security breach. For example, a smoke detector may indicate the presence of smoke in the building when it is simply an accumulation of dust on the device. Likewise, a contact switch on a warehouse door may indicate that the door has been opened when, in fact, the magnetic switch has simply stopped working correctly. Such false alarm situations can be numerous and can cost building owners a substantial amount of money each year in business down-time, security agency response fees, and maintenance personnel truck rolls. In many instances, the purported cause of a false alarm is repaired but other related problems exist with the systems that are not detected until further false alarms events occur.

In some embodiments, the alarm analysis system 310 is configured to predict conditions that are precursors to a false alarm condition and fix the errors before they occur. In some embodiments, sensor data from commercial security products (e.g., the building subsystems 228 and/or the security system 302a) is monitored by the alarm analysis system 310 and used to predict false alarms. Based on the predicted false alarms, the alarm analysis system 310 can be configured to generate preventative maintenance or training recommendations.

The alarm analysis system 310 can predict and/or identify anomalous behavior by tracking normal security product behavior at the protected premises. This past behavior can set a standard by which the security system can be measured against. When a deviation from that norm is detected in the operation of the security system, the alarm analysis system 310 can be configured to analyze the type of deviation that occurred, determine whether the behavior is of a type that is a precursor to a false alarm condition, and determine a response that is necessary for preventing the false alarm from occurring.

Moreover, the alarm analysis system 310 can be configured to predict other related aspects of the security product that may need attention. For example, if a magnetic door sensor is exhibiting aberrant behavior, the alarm analysis system 310 can be configured to generate a prediction that the magnetic door sensor will fail. Furthermore, the alarm analysis system 310 can be configured to determine the age of that sensor as well as all similar sensors in the building that are the same type and age as the failing one. The data intelligence system can notify building operators that the magnetic door sensor is failing and can indicate similar door sensors that may require attention.

The alarm analysis system 310 can be a "self-healing" system configured to automatically pushing parameter updates to the building subsystems 228 and/or configured to automatically schedule time for maintenance to be conducted. Using such a self-healing system, a building owner does not need to be notified that there was a problem with their security product since the building system can be configured to automatically fix itself. Therefore, when a security issue arises, the building owner can have a high level of confidence that it is an actual security event rather than a false alarm.

The alarm analysis system 310 can be configured to analyze the historical security data 312 and determine false alarm rules. The false alarm rules may indicate that particular patterns of events (e.g., alarms occurring, detected motion, etc.) at the security systems 302a-302d are indicative of an event or situation at the buildings 10a-10d that causes false events. Furthermore, the false alarm rules may include recommendations and provide a solution to reducing false alarms. For example, a false alarm rule may be indicative of particular event patterns that indicate that building employees are not being properly trained to utilize a security system. The false alarm may include a recommendation indicating that building employees do not understand how to properly perform a particular job duty or operate particular security system devices.

The signals generated by building systems (e.g., from sensors the building subsystems 228 e.g., intrusion, fire, or HVAC systems) may be discrete events or continuous signals generated in response to certain actions performed either by human beings or based on based on sensor data (e.g., detecting an intrusion event, detecting motion in a zone, etc.). In some embodiments, the events are marked by site, system, date, event type, zone, alarm, and/or can include a comment. An example is Table 1 below.

TABLE 1

Event Data Format

| Site | System | Date And Time | Event | Zone | Alarm | Comment |
|---|---|---|---|---|---|---|
| Site A | Security System | Feb. 1, 2015 | Motion Detected | Zone A | N/A | N/A |

Based on the event data e.g., the data shown in Table 1, the systems and methods discussed herein can predict if a building site needs attention and alert building users to actionable insights to prevent false alarms. The events can be analyzed to detect patterns that are indicative of a situation that causes false alarms. The "patterns" or "sequences" may be indicative of inherent causality relationships indicative of a situation that causes a false alarm. The alarm analysis system 310 can be configured to generate the event sequences by performing a parameter search, a general sequential pattern (GSP) algorithm, first and/or second order Markov chains, neural networks, decision trees, Bayesian analysis, and/or any other method that derives patterns of events and identifies potential issues, e.g., false alarm rules. Based on the detection of the presence of a particular false alarm sequence at a building, a situation that causes false alarms can be identified and a recommendation for alleviating the situation can be generated.

Based on the analysis, the alarm analysis system 310 can provide interfaces to an end user with the results of the analysis. The interfaces may inform a user about the current status of their system, whether maintenance is or will be required, and/or suggested parameter changes for the security system that will result in a reduction in false alarms. The alarm analysis system 310 can, based on the event data received for the building site and the identified false alarm rules, prepare a recommendation informing an end user of parameter adjustments or maintenance that may be necessary to prevent false alarms from occurring. The insight may be to adjust or update a door delay, to train employees to better understand access systems, replace a battery for a sensor with a low battery, repair electrical equipment where there is a ground fault, etc. The recommendation can be transmitted to the end user via an interface and the user can access the insight via one or more of the user devices 314. A subscription server, mobile application, website, or other medium can be used to deliver the insights to the end user via the user devices 314. Based on the event data and/or the actions which a user may take to reduce risk, the alarm analysis system 310 can be configured to generate a risk profile indicating the ranking of a particular building site in terms of safety and comparing the particular building site against other building sites.

The alarm analysis system 310 can identify recommendations to use in reducing the number of false alarms reported by the security system 302a. In some embodiments, the false alarm rules that the alarm analysis system 310 can be configured to determine can be surfaced to a domain expert that can review the false alarm rules and the event sequences associated with the false alarm rules and provide recommendations for the false alarm rules. The domain expert may be a Certified Software Asset Manager (CSAM). The CSAM may provide input to the alarm analysis system 310 for determining the alarms and can further provide contextual information for the rules. For example, the domain expert may provide a title or maintenance directions for each rule determine by the alarm analysis system 310. Based on identified false alarm rules, the alarm analysis system 310 can receive data regarding what is causing false alarms, along with a recommendation for addressing that group or an identifier tag, e.g., a title for the rule.

The alarm analysis system 310 can further be configured to gather additional event data and apply a second round of analytics on the rules relative to the additional data. This may allow the false alarm rules to be updated or modified based on data that was not considered when the rule was generated. The false alarm rules, and the data used to generate the false alarm rules, may span multiple sites or one particular site. Furthermore, the false alarm rules and the data used to generate the false alarm rules may be associated with particular sites in a vertical. For example, a certain square footage may define a vertical so that similarly sized building sites can be analyzed together. By analyzing data for a particular group of building sites, recommendations can be generated for the building sites of the group based on a large data set. Another example of a vertical may be a market vertical (e.g., law firm buildings may form one vertical, grocery stores may form a vertical, schools may form another vertical, etc.).

Figure 3:
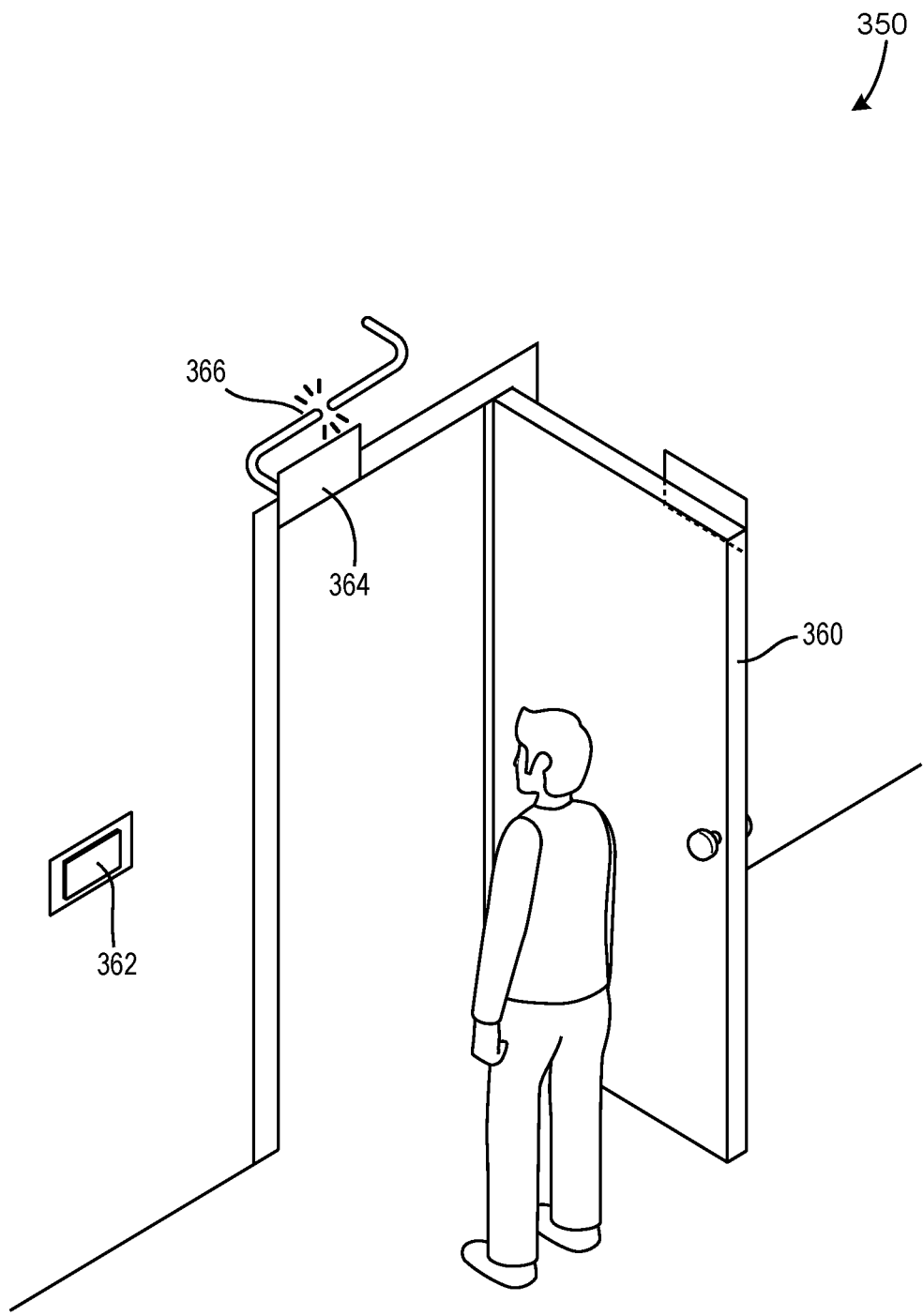
FIG. 3 is a drawing of a door which can be used in conjunction with a door security system shown to malfunction, according to some embodiments.

Referring now to FIG. 3, a door security system 350 is shown, according to an exemplary embodiment. System 350 is shown to include a door 360, which may be locked and require credentials in order to access and/or open. In some embodiments, door 360 is configured to lock automatically and require credential access in order for a user to gain access to and through door 360. As shown in the exemplary embodiment of FIG. 3, system 350 includes a door controller 362 configured adjacent to door 360. Door controller 362 may be configured to accept user credentials and, upon verification of said credentials via a security system (such as, for example, security systems 302a-302d of FIG. 2) to which door controller 362 may be directly or indirectly connected, grant access to the user in view of the verified credentials.

System 350 is also shown to include a magnetic door lock 364 configured above door 360. In some embodiments, magnetic door lock 364 may be configured to operate in conjunction with door controller 362 so as to provide limited/select/restricted access to door 360. Magnetic door lock 364, similar to door controller 362, may be connected to a security system such as security systems 302a-302d of FIG. 2 via wires 366, for example. As shown in the exemplary embodiment of FIG. 3, wires 366 are shown to be severed and thus have a fault that may compromise system 350 by disabling magnetic door lock 364 or otherwise disabling locking and security means of door 360. Faults such as that shown in the exemplary embodiment of FIG. 3 are not uncommon to door security systems, and in order to prevent undesired access to secure doors such as door 360, systems such as system 350 must be monitored and maintained accordingly.

Figure 4:
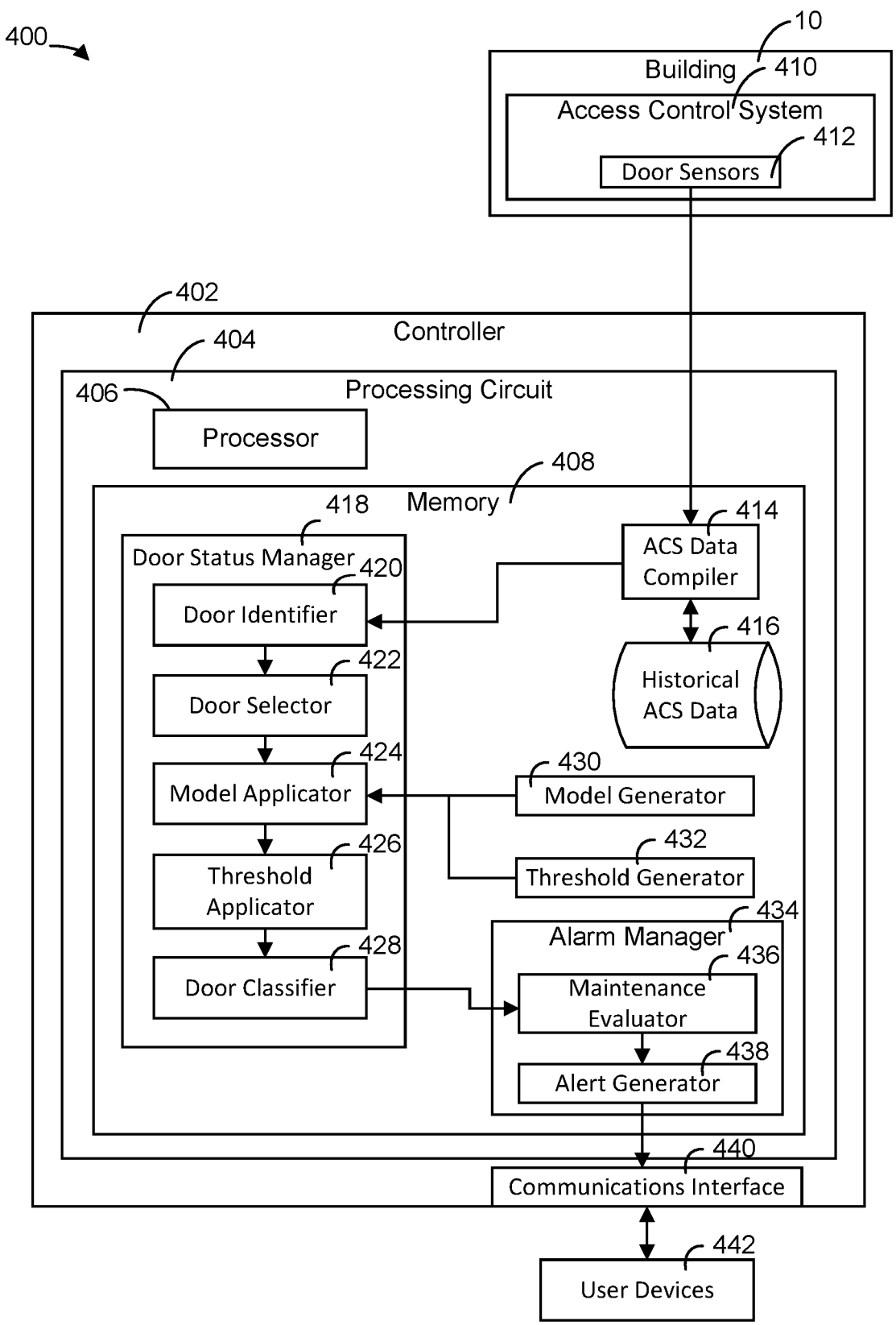
FIG. 4 is a block diagram of a building security system which can be used in conjunction with the door of FIG. 3 and the building of FIG. 1, according to some embodiments.

Referring now to FIG. 4, a block diagram of a building security system is shown, according to some embodiments. In some embodiments, system 400 can be configured to function in conjunction with other systems. For example, system 400 may be implemented in conjunction with building 10 and systems thereof, such as HVAC system 100 as shown in FIG. 1. Further, system 400 may vary in size, including that of building 10 as shown in FIG. 4, as well as other components thereof. In some embodiments, system 400 of FIG. 4 may pertain to system 350 of the exemplary embodiment of FIG. 3.

System 400 is shown to include building 10, according to an exemplary embodiment. Building 10 may be the same as or similar to building 10 of FIG. 1. Building 10 is shown to include an access control system 410, as shown in the exemplary embodiment of FIG. 4. Access control system 410 may be tailored to specifications of building 10. For example, access control system 410 may accommodate various entrances and exits, both to and within building 10. Further to the previous example, within and around building 10, various points of entry may be equipped with sensors such as door sensors 412, as shown in the exemplary embodiment of FIG. 4. Door sensors 412 may be positioned on doors, door frames, or other adjacent portions of doors or other points of entry and exit. In some embodiments, door sensors 412 may include wired connections to access control system 410 and/or other systems of building 10. In other embodiments, door sensors 412 may be connected wirelessly to access control system 410 via Wi-Fi connection, Bluetooth connection, or other wireless connection means. Door sensors 412 may also be connected to one another via wired or wireless means. Access control system 410 may also include other sensors and various components in order to monitor and control access to building 10.

System 400 is shown to include a controller 402, as well as a processing circuit 404, a processor 406, and a memory 408, according to some embodiments. Controller 402 can include one or more computer systems (e.g., servers, supervisory controllers, subsystem controllers, etc.) that serve as system level controllers, application or data servers, head nodes, or master controllers for system 400. Controller 402 may communicate with multiple downstream systems or subsystems.

Controller 402 is shown to include a communications interface 440 and a processing circuit 404 having a processor 406 and memory 408. Processor 406 can be implemented as a general-purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

Memory 408 is shown to include an access control system (AC S) data compiler 414, as shown in the exemplary embodiment of FIG. 4. ACS data compiler 414 is shown to be in communication with door sensors 412 of access control system 410 for building 10, according to some embodiments. ACS data compiler 414 may receive data from one or more doors and/or one or more sensors such as door sensors 412 of building 10. In some embodiments, ACS data compiler 414 may receive, organize, format, and/or otherwise sort data received from door sensors 412 of access control system 410. Additionally, ACS data compiler 414 may be configured relative to user and/or operator preferences. For example, in some embodiments ACS data compiler 414 may be configured to compile data chronologically and/or may be configured to sort data according to its origin.

ACS data compiler 414 is also shown to be in communication with historical ACS data 416, according to the exemplary embodiment of FIG. 4, which may be similar to historical security data 312 as shown in FIG. 3. In some embodiments, data received by ACS data compiler 414 may be communicated to historical ACS data, where data may be further organized, formatted, sorted, and/or stored. In some embodiments, data may also be communicated from historical ACS data 416 to ACS data compiler 414. Historical ACS data 416 may include data from multiple buildings such as building 10, as well as multiple doors and door sensors such as door sensors 412. In some embodiments, historical ACS data 416 may be in communication, directly or indirectly, with multiple buildings and may subsequently store data corresponding to one or more buildings. Historical ACS data 416 may also be configured to accommodate user and/or operator preferences, such as storing select data or storing data for a specific timeframe. It should also be noted that both ACS data compiler 414, and historical ACS data 416 may also be configured so as to segment data received from door sensors 412 of access control system 410 of building 10. For example, ACS data compiler 414 and/or historical ACS data 416 may be configured to segment data according to user and/or operator preferences which may include segmenting data according to various time intervals, various contents of data, as well as other possible parameters.

Data may be compiled into various formats in order to facilitate analysis and other manipulation of the data. In some embodiments, data may be identified based on contents of said data. For example, data collected from door sensors 412 may include access granted (AG) events, as well as door forced open (DFO) events. An AG event may include a user providing credentials through various means (key fob, biometric data, code entry, etc.) in order to gain access to and through a door/doorway, with said door/doorway having one or more sensors such as door sensors 412. A DFO event may closely follow another event, including a preceding DFO event, and may be identified as such based in a specific timeframe (i.e. 5 seconds, 10 seconds, 15 seconds, etc.). In some aspects, DFO alarms in significant quantities can cause alarm noise for a security operations center (SOC). Accordingly, a significant increase in DFO alarms generated by a device and/or door over time may result in an overall alarm volume large enough to interfere with identification of human causes (e.g., intruders). Such an increase in DFO alarms, also known as a DFO flood, can be caused by malfunctions or faults to either software or hardware such as the magnetic door lock 364 and/or the wires 366 as shown and described previously. Other events may also exist, such as a door held open (DHO event). Various different events may be identified by ACS data compiler 414 according to user and/or operator specifications as wells as specific time intervals for which data from door sensors 412 may correspond. For example, data from door sensors 412 may indicate various amounts of time that a specific door was open, as well as time periods between door openings. As such, events may be identified based on different door openings and time durations of the data received from door sensors 412 as well as access control system 410. ACS data compiler 414 may also be configured to identify event pairs, with said pairs including two events occurring within a specified time period. Similar to the determination of different events, event pairs may be identified based on computed differences between timestamps for events. Furthermore, each door or set of doors may be represented by a compiled (chronologically or otherwise) sequence of timestamped data, events, and event pairs representing consecutive event pairs (AG-DFO, AG-DO, DFO-DFO event pairs and otherwise) occurring for a door or set of doors.

In some embodiments, the timeframe for which data may be classified as an event may be may be set according to the preferences of a user and/or operator. Additionally, the timeframe for which two consecutive events may be paired and thus considered an event pair may also be subject to preferences of a user and/or operator. For example, an event pair may include a first DFO event closely followed by a second DFO event, with the second DFO event occurring within a specified time of the first DFO event, with said specified time provided by a user and/or operator. In some embodiments, time intervals computed may follow a log-normal distribution. However, should various components of data be estimated or rounded (or otherwise have limited resolution), for example to the nearest second, the data may deviate from a log-normal distribution. Accordingly, such data may be placed into various bins (for example, defined short, medium, and long durations) and as such a Poisson distribution may apply or be applied. In some embodiments, ACS data compiler 414 may be further configured to compile and/or identify various events and event pairs for one or more doors. For example, a user and/or operator may wish to provide specific time intervals for which events are to be identified that apply to one or more single doors or one or more sets of doors. Further to the previous example, the same time interval specifications provided by a user and/or operator may be applicable to all exterior doors of building 10, or may apply to a pair of doors within close proximity.

Memory 408 is shown to include an door status manager 418, as shown in the exemplary embodiment of FIG. 4. In some embodiments, door status manager 418 may be configured the same as or similar to alarm manager 316 as shown in the exemplary embodiment of FIG. 2. Door status manager 418 is shown to be in communication with ACS data compiler 414, and may further be configured to receive ACS data from ACS data compiler 414. Data received by door status manager 418 may be configured relative to the preferences of a user and/or operator. For example, door status manager 418 may receive data for one or more specific doors and or time periods. Additionally, door status manager 418 may be configured to facilitate additional components of system 400 as shown in FIG. 400 so as to promote data analysis of data received from ACS data compiler 414.

Memory 408 is shown to include a door identifier 420, as shown in the exemplary embodiment of FIG. 4. Door identifier 420 may be in direct or indirect communication with ACS data compiler 414, according to some embodiments. Additionally, door identifier 420 may receive data from ACS data compiler 414. In some embodiments, data received by door identifier 420 from ACS data compiler 414 may have been collected by door sensors 412 of access control system 410 form building 10 or similar. Upon receiving data from ACS data compiler 414, door identifier 420 may determine one or more doors to which the received data corresponds and/or from which door or doors the received data was collected. Door identifier 420 may also be configured according to preferences of a user and/or operator. For example, door identifier 420 may be configured to identify data for single doors, or may further be configured to identify for one or more groups of doors. Door identifier 420 may also be configured to group and/or sort data according to one or more characteristics, among those characteristics being door or door sensors 412 of origin.

Memory 408 is shown to include a door selector 422, as shown in the exemplary embodiment of FIG. 4. Door selector 422 may be configured to be in communication with door identifier 420. In some embodiments, door identifier 420 may communicate data indicative of or corresponding to one or more specific doors, for which door selector 422 may select one or more doors and/or the corresponding data. Door selector 422 may be configured to accommodate preferences of a user and/or operator. For example, if a user and/or operator wanted to select data for specifically entry doors, exit doors, or doors in a specific area of building 10, door selector 422 may be configured to receive and accommodate such preferences. In some embodiments, door selector 422 may be configured to select specific data for one or more selected doors upon receipt of said data from door identifier 420. It should also be noted that both door identifier 420 and door selector 422 may also be configured so as to segment data received from ACS data compiler 414 and historical ACS data 416. For example, door identifier 420 and/or door selector 422, in addition to ACS data compiler 414 and historical ACS data 416, may be configured to segment data according to user and/or operator preferences which may include segmenting data according to various time intervals, various contents of data, as well as other possible parameters.

Memory 408 is shown to include a model generator 430, as shown in the exemplary embodiment of FIG. 4. Model generator 430 may generate various different models depending on user and/or operator preferences. For example, model generator 430 may produce a Hidden Markov model. According to some embodiments, model generator 430 may further produce a two-state Hidden Markov model, with the two states corresponding to normal operation and abnormal/faulty operation/behavior, respectively. The models generated by model generator 430 may be configured to analyze and/or be trained on data collected from door sensors 412, for example, which may follow a long-normal distribution. In some embodiments, the model or models generated by model generator 430 may be capable of being trained on various data, for example the data originally collected from door sensors 412 of access control system 410 of building 10. Additionally, model generator 430 may be configured to compute latency, which can be calculated as the difference between server time and device time for a given event, such as a DFO event. In some embodiments, a difference between corresponding latency values may be calculated so as to avoid misclassification of hardware and/or software based on analysis of raw latency data. Latency patterns may be identified using the application of one or more models such as the Hidden Markov model as mentioned previously, as well as Baum-Welch models and/or Viterbi models One or more patterns may be identified in collected data, such as data collected indicating DFO events. In some embodiments, latency patterns that may be identified can correspond to individual hardware with spiking latency (e.g., indicating a fault/malfunction), a disconnect in collection/communication of data (e.g., indicating broken hardware), an increase or decrease in average latency (e.g., indicating a change in hardware configuration), or consistently high latency (e.g., indicating misconfiguration of hardware or software). For example, model applicator 424 may receive data from door selector 422 for which one or more doors have been selected. Model applicator 424 may then apply one or more models generated by model generator 430 to the data received from door selector 422 so as to train the one or more models on the received data. In some embodiments, this may include training the model or models on a select set of time intervals or data otherwise selected for training. For example, model applicator 424 may apply models produced by model generator 430 to received data such that the models are trained for all time delta sequences, with said sequences determined by components such as ACS data compiler 414, historical ACS data 416, door identifier 420, door selector 422, or other possible components. In some embodiments, this may involve the implementation of Baum-Welch or Viterbi algorithms, as well as other possible algorithms. Data on which the models are to be trained may be determined according to preferences of a user and/or operator, or may be determined otherwise.

Models may be generated according to data collected from door sensors 412, as well as other historical data such as that of historical ACS data 416. In some embodiments, Hidden Markov models and/or other models may be generated for specific doors or for specific sets or groups of doors. Models may be generated according to various data, with said data being collected from door sensors 412 or historical ACS data 416, and may further be generated according to consecutive (chronological) event pairs. Generated models may be generated such that the models may be trained for various data sets, such as those corresponding to data collected from door sensors 412, compiled by ACS data compiler 414, and subsequently communicated to components such as door selector 422.

Memory 408 is shown to include a model applicator 424, as shown in the exemplary embodiment of FIG. 4. In some embodiments, model applicator 424 is shown to be in communication with door selector 422 and model generator 430. Model applicator 424 may be configured to apply one or more models generated by model generator 430 to one or more sets of data corresponding to one or more doors as received from door selector 422. In some embodiments, model applicator 424 may be configured to apply specific models to specific data corresponding to specific doors, and may be further configured to do so according to user and/or operator preferences. For example, a user and/or operator may desire certain parameters or rules enforced for a specific door or set of doors. Accordingly, model applicator 424 may apply models corresponding to the aforementioned user and/or operator preferences so as to apply, implement, and enforce any desired parameters.

Model applicator 424 may also be configured to train models generated by model generator 430 based on data received from door selector 422. For example, model generator 430 may generate a Hidden Markov model that corresponds to event pairs. Model applicator 424 may be configured to train said model according to corresponding event pairs as complied/identified by ACS data compiler 414 and subsequently received from door selector 422. In some embodiments, model applicator 424 may receive data from door selector 422 that follows a log-normal distribution in terms of the time intervals as identified and computed for various identified events. Accordingly, model applicator 424 may be configured to apply and train the corresponding model or models relative to the received data. However, model applicator 424 may also receive data from door selector 422 that is limited in resolution, which is to say that some portions of the data may be estimated and/or rounded, for example. In the event of limited resolution, data may be placed into various bins, and model applicator 424 may implement a Poisson distribution in training one or more models generated by model generator 430.

Model applicator 424 may also be configured to determine various metrics based on both received data from door selector 422 as well as model generator 430. In some embodiments, metrics calculated by model applicator 424 may result from the application of one or more models to received data or the training of one or more models on received data. Based on the application of one or more models to one or more data sets, model applicator 424 may compute a probability metric as well as a combined probability score for the door or set of doors to which the received data and applied model or models correspond. In some embodiments, the probability metric and combined probability score are calculated in order to determine if a door or set of doors is operating normally or malfunctioning. In various embodiments, the probability metric and combined probability score may be calculated using various means and methods according to the model or models applies and the data received to with said model or models correspond. The probability metric and combined probability score could be mean, median, or any other type of metric generated based on the individually identified segment probability metrics.

Memory 408 is shown to include a threshold generator 432, as shown in the exemplary embodiment of FIG. 4. Threshold generator 432 may be configured to develop one or more thresholds for a door and/or set of doors. Said thresholds may correspond to the probability metric and combined probability score calculated by model applicator 424 and as such may be directly comparable with the probability metric and combined probability score. In some embodiments, threshold generator 432 may develop thresholds based on historical data, such as data corresponding to that of historical ACS data 416, for example. However, in other embodiments, threshold generator 432 may develop thresholds according to user preferences. User preferences data may correspond to preferences and/or parameters desired by a user and/or operator, for example. Should a user and/or operator desire specific levels of performance, user preferences may be provided to threshold generator 432 so as to accommodate the desired specified levels of performance. Threshold generator 432 is shown to be in communication with a threshold applicator 426, as shown in the exemplary embodiment of FIG. 4. Threshold generator 432 may communicate developed thresholds to threshold applicator 426 such that said developed thresholds may be applied to data received from model applicator 424.

Memory 408 is shown to include a threshold applicator 426, as shown in the exemplary embodiment of FIG. 4. Threshold applicator 426 can function similarly to model applicator 424. Additionally, threshold applicator 426 is shown to be in communication with threshold generator 432, and accordingly may receive developed thresholds from threshold generator 432. Threshold applicator 426 may then apply developed thresholds received from threshold generator 432 to corresponding data received from model applicator 424. In some embodiments, threshold applicator may receive calculated probability metrics and combined probability scores from model applicator 424, and may subsequently apply corresponding developed thresholds to said probability metrics and combined probability scores. For example, upon receiving probability metrics and a combined probability score (from model applicator 424) as well as a developed threshold (from threshold generator 432), threshold applicator 426 may compare the probability metrics and combined probability score to the developed threshold. Further to the previous example, threshold applicator 426 may determine if the probability metrics and combined probability score exceed the generated threshold or fall within an accepted range. Accordingly, the results of such a comparison may be communicated to other components of system 400 within memory 408.

Memory 408 is shown to include a door classifier 428, as shown in the exemplary embodiment of FIG. 4. Door classifier 428 is shown to be in communication with threshold applicator 426, according to some embodiments. Door classifier 428 may receive from threshold applicator 426 one or more thresholds as generated by threshold generator 432, as well as probability metrics and a combined probability score as calculated by model applicator 424. As the aforementioned threshold or thresholds and calculated values have been compared by threshold applicator 426, door classifier 428 may receive a result of said comparison. In the event that door classifier 428 receives an indication that the probability metrics and/or combined probability score exceed the threshold, door classifier 428 may classify the corresponding door or set of doors as malfunctioning. Should the probability metrics and/or combined probability score fall within a defined acceptable range, door classifier 428 may classify the corresponding door or set of doors as normally functioning. Door classifier 428 may also be configured to store results of the previously mentioned door classifications.

Memory 408 is shown to include an alarm manager 434, as shown in the exemplary embodiment of FIG. 4. Alarm manager 434 is shown to include maintenance evaluator 436 as well as alert generator 438, according to some embodiments. In some embodiments, maintenance evaluator 436 and alert generator 438 of FIG. 4 may be the same as and/or similar in configuration and function to alarm manager 316 and maintenance manager 318 as shown in the exemplary embodiment of FIG. 2. Alarm manager 434 may be configured to manage maintenance evaluator 436 and alert generator 438, and may also be configured to ensure data communication between components of door status manager 418, such as door classifier 428, and maintenance evaluator 436, for example.

Memory 408 is shown to include maintenance evaluator 436, as shown in the exemplary embodiment of FIG. 4. Maintenance evaluator 436 is shown to be in communication with door classifier 428, according to some embodiments. Door classifier 428 may classify one or more doors and/or sets of doors as operating normally or malfunctioning. If door classifier 428 communicates an indication of normal operation for a door or set of doors to maintenance evaluator 436, then maintenance evaluator 436 may be configured to log the indication of normal operation and may also be configured to identify that the door or set of doors does not require maintenance. If door classifier 428 communicates an indication of malfunction for a door or set of doors, the maintenance evaluator 436 may be configured to log the indication of malfunction and may also be configured to identify potential maintenance needs for the door or set of doors. In some embodiments, maintenance evaluator 436 may include or have access to historical maintenance records for doors within building 10, and as such may be configured to identify recent maintenance as well as upcoming or overdue maintenance corresponding to the door or set of doors. In some embodiments, a door or set of doors may be classified as malfunctioning due to required maintenance or improperly performed maintenance that was recently conducted. For either of the aforementioned instances, maintenance evaluator 436 may identify possible maintenance needs for the door or set of doors and communicate said maintenance needs to alert generator 438.

Memory 408 is shown to include alert generator 438, as shown in the exemplary embodiment of FIG. 4. In some embodiments, such as that of FIG. 4, alert generator 438 is shown to be in communication with maintenance evaluator 436. Alert generator 438 may receive communication from maintenance evaluator 436 indicating a door or set of doors is operating normally or malfunctioning. If alert generator 438 receives an indication that a door or set of doors is operating normally, alert generator 438 may prepare an alert for a user and/or operator indicating that said door or set of doors is operating normally. Additionally, if alert generator 438 receives an indication that a door or set of doors is malfunctioning, alert generator 438 may prepare an alert for a user and/or operator indicating that said door or set of doors is malfunctioning. The contents of any alerts generated by alert generator 438 may vary according to whether alert generator 438 received an indication of normal function or malfunction for a door or set of doors. For example, a notification that may be displayed to a user and/or operator indicating normal operation of a door or set of doors may include a notification of normal operation, an indication of recent use, and/or an indication of previous maintenance or suggested upcoming maintenance as well as other possible information. In another example, a notification that may be displayed to a user and/or operator indicating malfunction of a door or set of doors may include a notification of malfunction, instances of malfunction (timestamps, dates, etc.), and/or recommended maintenance, as well as other possible information. Other possible information that may be communicated to a user and/or operator in an alert/notification generated by alert generator 438 may include identification of various personnel, location within a building such as building 10, as well as usage metrics. Additionally, information communicated to a user and/or operator by alerts/ notifications generated by alert generator 438 may be configured to include various information according to user and/or operator preferences.

Memory 408 is shown to include a communications interface 440, as shown in the exemplary embodiment of FIG. 4. In some embodiments, communications interface 440 can be configured to communicate operation of system 400 to a user and/or operator. Communications interface 440 can, for example, indicate activity of one or more components of system 400. Communications interface 440 is shown to be in communication with alert generator 438, according to the exemplary embodiment of FIG. 4. For example, communications interface 440 may send, distribute, and/or otherwise communicate/disseminate the contents of alerts/notifications generated by alert generator 438. In some embodiments, communications interface 440 can be configured to communicate parameters or constraints to a user that may be in place for system 400 and/or one or more components thereof. Communications interface 440 may further be configured format alerts/notifications, such as those generated by alert generator 438, to be communicated through various means which may include push notifications, text messages, emails, audible announcements and visual displays, as well as other possible means.

Memory 408 is shown to include user devices 442, as shown in the exemplary embodiment of FIG. 4. User devices 442 are shown to be in communication with communications interface 440 and as such may receive communicated content therefrom. For example, user devices 442 may receive alerts generated by alert generator 438 and communicated to user devices 442 by communications interface 440. User devices may include various devices including but not limited to smartphones, tablets, computers, radios, and other devices capable of receiving communication from communications interface 440. User devices 442 may allow one or more users and/or operators to view alerts as well as take various actions in response to said alerts. For example, a user and/or operator may be able to "flag" information on an alert, forward an alert to other personnel, or respond to the alert by enabling, disabling, or otherwise altering current operation status for various components. Additionally, a user and/or operator may also be able to interact with alerts and other data communicated to user devices 442 in other ways.

In some embodiments, system 400 may be implemented in order to identify DFO alarm floods. DFO floods occur when a large number of DFO alarms are generated over a short amount of time, and are typically indicative of hardware failure or misconfiguration such as magnetic door lock 364 as shown in FIG. 3. The volume of alarms generated from a DFO flood can overwhelm various components such as security systems 302*a*-302*d*, as well as components as shown in FIG. 4 such as access control system 410, for example. Additionally, the resources required to process and evaluate alarms generated due to DFO alarm floods are substantial in terms of both technology and components, as well as monitoring personnel and alarm fatigue. As a result, DFO floods may lead to alarms generated legitimately going uninvestigated due to the quantity of alarms generated by said DFO floods. Doors that are functioning normally (and not malfunctioning) generate what is defined to be a relatively low number of DFO alarms. By identifying DFO floods and the door or doors generating the alarms causing the DFO floods, operator workload can be reduced significantly. Effective detection and identification of DFO floods allows for DFOs to be filtered such that DFOs not generated as a part of a flood may be categorized as such. Accordingly, DFOs identified as having been generated as part of a DFO flood may be used to generate door service advisory warnings such that the door or doors contributing to the DFO floods may be inspected and maintenance may be performed, if required.

In some cases, the DFO alarms for a door or a selection of doors may follow identifiable seasonal patterns, or may also be attributable to various human behavior and habits, some of which may account for the aforementioned seasonal patterns. For example, a flooded door may exhibit large numbers of DFO events without any discernable pattern, contrary to normally functioning doors. Further to the previous example, a flooded door may, for example, generate 60 DFO alarms for a given day, with days before and after the given day including less than five DFO alarms generated. In comparison, a normally functioning door may exhibit a pattern—for example, an identifiable five day work week— in which a normally functioning door may generally generate between three and six DFO alarms per day, with obvious indications of zero generated DFO alarms on off days, for example weekends.

The methodology for detecting DFO floods can be similar to that for identifying malfunctioning doors and door locks relative to normally functioning doors and door locks. As described previously, detecting malfunctioning doors and/or locks exhibiting frequent faults is done by identifying and analyzing door event pairs, for example DFO-DFO event pairs. Similarly, identifying door floods involves identifying and analyzing DFO-DFO event pairs. In some cases, the average elapsed time between two DFO events of a DFO-DFO event pair may be substantially greater than that of other types of door event pairs. As such, should various analyzed DFO-DFO pairs be analyzed using bins, the bins may be designated as having lesser greater elapsed times as well as greater ranges of elapsed time for the aforementioned bins. For example, a bin for "short" elapsed times for one type of event pair may include elapsed times less than 30 seconds, where as a bin for "short" elapsed times for DFO-DFO event pairs may include elapsed times less than 10 minutes. However, such parameters can be determined based on analysis of historical data, such as historical ACS data 416, with the parameters learned using Baum Welch and/or Viterbi methods the same as or similar to those described for AG-DFO events. Just as for the analysis of AG-DFO event pairs, a model is generated (in some embodiments, a two-state Hidden Markov Model, with one state to describe normal operation and another to describe flood behavior) and applied to data for a selected door as described with reference to analysis of AG-DFO pairs for malfunctioning doors. Generally, the difference between the analysis of AG-DFO event pairs to identify malfunctioning doors and/or locks and the analysis of DFO-DFO event pairs is the parameterization of the model as described previously, which is determined based on historical data for both applications.

It should be noted that the components of the system 400 as shown in the exemplary embodiment of FIG. 4 may perform differently than described above. For example, communications interface 440 may be configured to prepare and receive various different inputs from user device 442, and accordingly provide various different outputs in response to said inputs. Additionally, the components of system 400 as shown in the exemplary embodiment of FIG. 4 can function cooperatively in various ways. It should also be noted that system 400 may include alternative and/or different components in alternative embodiments.

Figure 5:
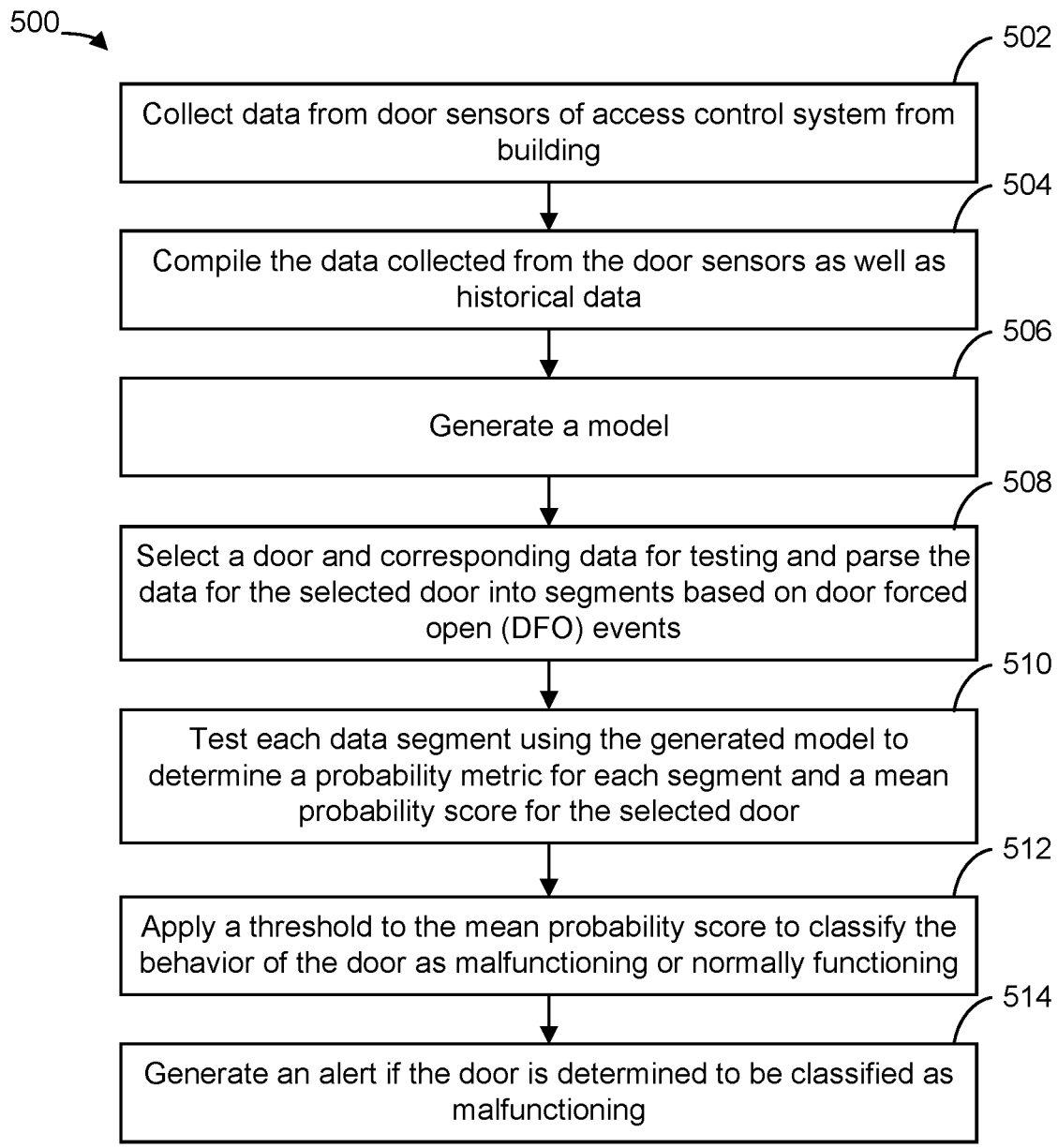
FIG. 5 is a flow diagram of a process of identifying malfunctioning doors which can be performed by the building security system of FIG. 4, according to some embodiments.

Referring now to FIG. 5, a process 500 of identifying malfunctioning doors within a building that can be performed by the building security system 400 of FIG. 4 is shown, according to an exemplary embodiment. The building security system 400 of FIG. 4 is configured to perform the process 500, according to some embodiments. Furthermore, any computing device as described herein can be configured to perform the process 500. In some embodiments, process 500 may pertain to system 350 of the exemplary embodiment of FIG. 3.

Generally, the building security system 400 can perform the process 500 to identify malfunctioning doors within a building by collecting data from door sensors of an access control system for a building, compiling data collected from door sensors as well as historical data, generating a model, selecting a door and corresponding data for testing, parsing data for the selected door into segments based on identified door forced open (DFO) events, testing each data segment using the generated model to determine a probability metric and combined probability score for each segment, applying a threshold to the probability metric and the combined probability score to determine if the door is malfunctioning, and generating an alert if the door is determined to be malfunctioning.

In step 502, the door sensors 412 of access control system 410 of building 10 collect data indicating activity of various doors within building 10. In some embodiments, door sensors 412 may be connected to access control system 410 through wired or wireless connections, and may communicate collected data to access control system 410 through said wired or wireless connections. For example, door sensors 412 may be configured on a door and/or door frame within building 10 such that door sensors 412 may collect data as said door is operated, with the collected data communicated to access control system 410. Collected data may be include door activity and events such as AG, DFO, and/or DHO events. Additionally, door data may be collected for various time segments or windows. For example, door data may be collected at set intervals, and door sensors 412 and access control system 410 may be configured to collect data at different intervals after detection of activity such as a door opening or closing.

In step 504, the data collected from door sensors 412 is compiled by ACS data compiler 414. In some embodiments, historical ACS data is also compiled by ACS data compiler 414. ACS data compiler 414 can also be configured to window and/or subsample the data collected from door sensors 412 in order to prepare the data for various testing. For example, the data collected may be windowed according to various events, such as AG, DFO, and/or DHO events identified by ACS data compiler 414 within the data. ACS data compiler 414 may be further configured to window data such that a variable quantity of recent events are windowed to provide meaningful statistics (e.g., a minimum of 50 events, 100 events, etc.). ACS data compiler 414 is also configured to window data such that minimal lag occurs between the beginning of a fault and detection of said fault, which is to say that ACS data compiler 414 can be configured to minimize the number of events windowed (e.g., 100 samples, 200 samples) from when data collected from door sensors 412 begins to indicate that a door may be malfunctioning and subsequently indicates a fault. It should be noted that ACS data compiler 414 may be configured to user and/or operator preferences as it relates to the aforementioned windowing of data to provide meaningful statistics as well as minimizing the number of events windowed. For example, different users and/or operators may implement different preferences for ACS data compiler 414 as well as other components of systems such as system 400 and as such, ACS data compiler 414 may sample and window data according to various preferences.

In step 506, a model is generated based on historical data of historical ACS data 416 as shown as a component of system 400 in FIG. 4. In some embodiments, different models may be generated for each door within a building such as building 10 based on data specific to that door as collected by access control system 410 and door sensors 412. The model generated in step 506 may be generated by model generator 430 of system 400 as shown in FIG. 4. In some embodiments, the model generated may be done so based on chronological event pairs of DFO-DFO events identified in historical data, with other event pairs (e.g., AG-AG, AG-DFO, AG-DHO, etc.) disregarded. In generating the model, the time between consecutive DFO-DFO event pairs is measured by computing the difference between the timestamps of the events as applied by door sensors 412 when collected by access control system 410 of system 400, for example. As such, each door is then represented by a chronologically ordered sequence of timestamps (from the DFO-DFO events) representing the time between each consecutive DFO-DFO event pair occurring for that door.

Further to the model generation of step 506, the model generated may be a two-state Hidden Markov Model trained on the set of all time delta sequences as mentioned above, and may be done so using various methods (e.g., Baum-Welch or Vitterbi algorithms). Generally, the time deltas computed (also referred to as the difference between timestamped events as described previously) follows a log-normal distribution. Depending on the embodiment, as well as the door sensors 412, access control system 410, and system 400, some timestamps may be stored with limited resolution, which is to say that the timestamps may be rounded the nearest second, for example. In such instances, log-normal state models may not be appropriate for the embodiment of system 400 as it applies to collected and historical data. In order to accommodate such cases with limited resolution timestamps, the calculated time deltas may be places into bins, with the bins corresponding to various time ranges (e.g. short, medium, long, as well as other configurations) and as such may then have a Poisson distribution applied in order to model behavior.

In step 508, a door is selected and the corresponding data for the selected door is parsed into segments based on identified door forced open (DFO) events. In some embodiments, ACS data compiler 414 compiles data according to the corresponding door, or may compile data according to other preferences and/or parameters. By parsing the data for the selected door into proper segments of DFO-DFO events, the data can be formatted such that it corresponds to the formatting of the historical data used in the generation of the model. As such, the data as parsed into segments in step 508 is thus appropriate for testing with the model as generated in step 506.

In step 510, each data segment is tested using the generated model to determine a probability metric, and combined probability score is subsequently determined for the selected door. In some embodiments, the combined probability score for the selected door may be determined based on the probability metrics computed for each data segment. After being parsed into data segments as specified in step 508, the data is tested in step 510 using the model generated in step 506. Step 510 may be performed in part by model applicator 424 of system 400 as shown in the exemplary embodiment of FIG. 4. In applying the model to the data for the selected door, a probability metric is computed for each data segment, and a combined probability score is then computed for the door in order to ultimately determine if the door events of the data segments for the selected door have been caused by normal use and function or if the selected door is malfunctioning.

In step 512, a threshold is applied to the combined probability score to classify behavior of the selected door. In some embodiments, step 512 includes the application of a predetermined threshold, which may be determined or otherwise calculated by threshold generator 432 of system 400 as shown in the exemplary embodiment of FIG. 4. In some embodiments, the threshold may be calculated based on historical data and/or user preferences for the selected door, the selected door model, or doors within the building such as building 10 of FIG. 4. The application of the threshold to the combined probability score for the selected door is performed by threshold applicator 426 of system 400 as shown in the exemplary embodiment of FIG. 4, according to some embodiments. Based on the application of the threshold to the combined probability score for the selected door, the behavior of the selected door is classified. In some embodiments such as the exemplary embodiment of FIG. 4 showing system 400, door classifier 428 performs the classification function based on the combined probability score for the selected door relative to the applied threshold.

In step 514, an alert is generated if the selected door is classified as malfunctioning. For example, if door classifier 428 of system 400 as shown in the exemplary embodiment of FIG. 4 classifies the selected door as malfunctioning based on the application of the threshold to the combined probability score, alert generator 438 may generate an alert for the given door indicating the malfunctioning classification. In some embodiments, this alert is generated in conjunction with maintenance evaluator 436, as shown in system 400 of FIG. 4. In some embodiments, an alert generated indicating that the selected door has been classified as malfunctioning may also indicate that the selected door requires maintenance. For example, this alert may indicate that maintenance has recently been performed on the selected door and may have been performed incorrectly, or may indicate that the selected door is past due for maintenance. The alert of step 514 may be communicated to a user and/or operator via communications interface 440 and subsequently user devices 442 of system 400 as shown in the exemplary embodiment of FIG. 4. For example, an alert indicating that the selected door has been classified as malfunctioning and requires maintenance may be displayed on a control panel, sent as a push notification to user smartphones or other devices, may initiate an alarm, or may provide other notification means to one or more users and/or operators.

As stated previously, it should be noted that the steps of process 500 may be performed differently than shown in FIG. 5. For example, all components of system 400 as shown in FIG. 4 may perform one or more of the steps of process 500. Additionally, one or more steps of process 500 may be skipped or repeated in some embodiments, and the steps of process 500 may also be completed in an order other than shown in FIG. 5. Also, additional steps may be completed in conjunction with and/or in addition to those shown in process 500 and FIG. 5, according to some embodiments.

Figure 6:
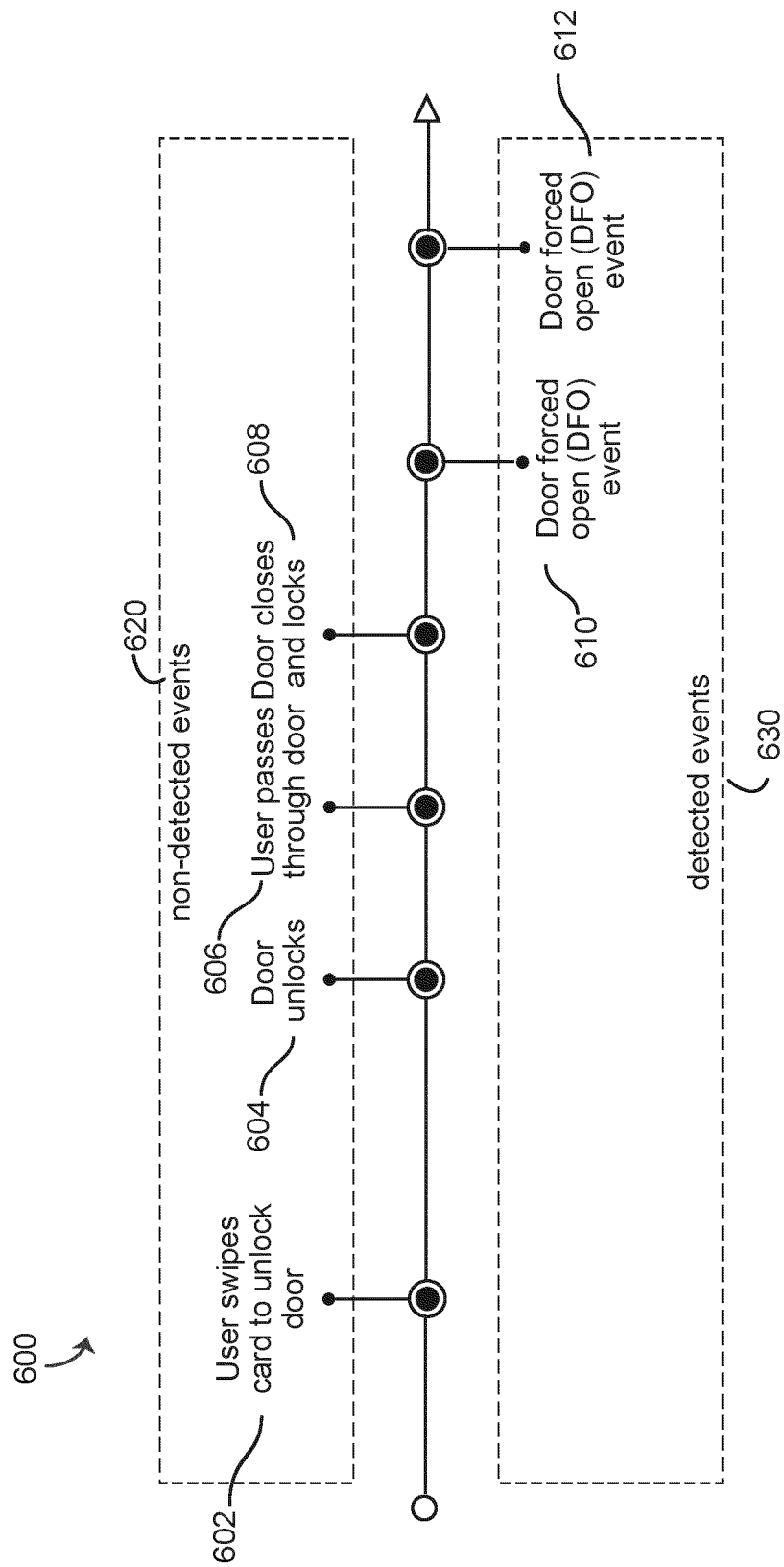
FIG. 6 is a flow diagram of a process of a door malfunctioning which can be identified using the building security system of FIG. 4 and the process of identifying malfunctioning doors of FIG. 5.

Referring now to FIG. 6, a process 600 is shown for detected and non-detected events for a given door, door sensors, and an access control system such as those shown as door sensors 412 and access control system 410 of building 10 in the exemplary embodiment of FIG. 4. The detected and non-detected events of process 600 may occur in an order different than shown and/or described below, according to some embodiments. Additionally, the event and/or steps of process 600 may be performed by various components of system 400 as shown in the exemplary embodiment of FIG. 4, both independently and/or in conjunction with other elements of system 400 as well as components that may not be shown. In some embodiments process 600 may relate to door 360 of system 350 of FIG. 3, as well as magnetic door lock 364 shown to include wires 366.

Process 600 is shown to include both non-detected events 620, as well as detected events 630. Non-detected events 620 are shown to include steps 602, 604, 606, and 608 which include a user swiping a card to unlock a door, a door unlocking, the user passing through the door, and the door closing and locking, respectively. With regard to non-detected events 620, these events may be classified events that occur physically but are not necessarily recorded electronically. For example, should steps 602, 604, 606, and 608 occur in succession as shown in the exemplary embodiment of FIG. 6, these events may not incorporate electronic components such as access control system 410. However, it should be noted that, in some embodiments, steps 602, 604, 606, and 608 and the corresponding events may be otherwise monitored electronically (e.g., security cameras, motion detectors, etc.).

Process 600 also includes detected events 630, which include steps 610 and 612 and the corresponding door forced open events. Detected events 630 may incorporate an access control system or other similar component/components, such as access control system 410 of system 400 as shown in the exemplary embodiment of FIG. 4.

In step 602, a user swipes a card to unlock a door, and an access granted (AG) event is registered. In some embodiments, this may include a user presenting a variety of forms of identification which may include a card, a key fob, entering a code or password, providing biometric data such as fingerprint, facial, or other recognition, as well as other identification means such as a mobile wallet of a smartphone or other device. Access control system 410 of system 400 as shown in the exemplary embodiment of FIG. 4 may perform the granting of access in response to the user swiping the card as shown in step 602. Additionally, if the user in step 602 were to present identification that was invalid, such as a card that was not authorized, access control system 410 or another similar system may deny access to the user.

In step 604, a door unlocks. As indicated in process 600, this non-detected event occurs in response to the non-detected event of step 602 in which a user swipes a card to unlock the door and grant access (thus creating an AG event), according to some embodiments. Upon an access control system, such as access control system 410 of system 400 as shown in the exemplary embodiment of FIG. 4, granting a user access based on valid credentials (e.g., the card being swiped), step 604 occurs in which the door unlocks. Subsequently, step 606 occurs in which a user passes through the door which is considered a non-detected event 620. However, as stated above, the classification of non-detected events 620 is done so with regard to access control system 410 or similar, and may be otherwise monitored electronically. After the user passes through the door in step 606, step 608 subsequently occurs in which the door closes and locks. Similar to steps 602, 604 and 606, step 608 is a non-detected event with regard to access control system 410, as these steps and the corresponding non-detected events 620 occur in response to step 602.

In steps 610 and 612, the door is forced open thus causing an event pair of door forced open (DFO) events to occur and be identified by an access control system such as access control system 410. Steps 610 and 612 and the corresponding events of the door being forced open are classified as detected events 630, as these are events that are registered with the corresponding data saved by access control system 410 according to some embodiments.

With regard to process 600 and the corresponding steps 602, 604, 606, 608, 610, and 612 as well as non-detected events 620 and detected events 630, it should be noted that other events may also occur. For example, a door held open (DHO) event may occur in which a user who has presented valid credentials and been granted access allows an additional user to pass through the door. In some embodiments, this may be registered as a detected event 630 based on elapsed time, door movement, as well as other possible factors. Additionally, the steps of process 600 may occur in various orders in some embodiments. For example, a DFO event such as in step 610 may occur, and be followed by an AG event such as in step 602 after the user causing the DFO event has passed through the door. As it relates to process 500 of FIG. 5, process 600 illustrates, for example, a series of non-detected events followed by a series of detected DFO events (in terms of the chronology of detected events 630). This is representative of the model generation process as described in step 506 of process 500, in which a model is generated based on historical data of DFO-DFO event pairs. That is to say that steps 610 and 612 of process 600 and the elapsed time there between may be representative of historical data implemented in generation of the model of step 506 of process 500 which may be performed by model generator 430 of system 400, according to some embodiments.

Figure 7:
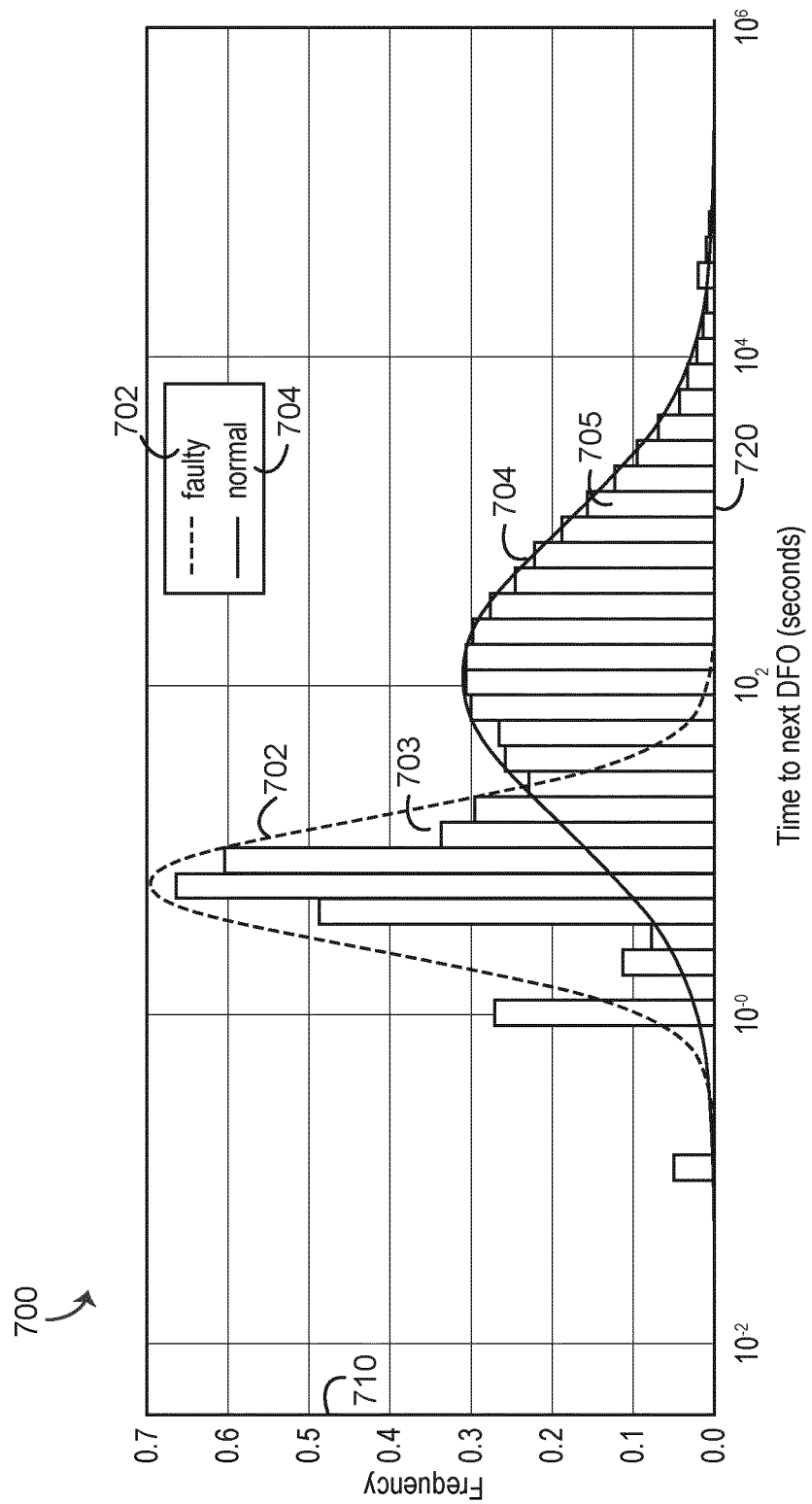
FIG. 7 is a drawing of a model generated event pair time distribution based on the process of identifying malfunctioning doors which can be used in conjunction with the building security system of FIG. 4 and the process of identifying malfunctioning doors of FIG. 5.

Referring now to FIG. 7, an event pair time distribution 700 is shown, according to an exemplary embodiment. The event pairs of event pair time distribution can correspond to door forced open-door forced open (DFO-DFO) event pairs, as well as other event pairs identified in both collected and historical data, such as that collected by door sensors 412 and that stored as historical ACS data 416 as shown in system 400 and the exemplary embodiment of FIG. 4. Additionally, event pair time distribution may correspond to step 506 of process 500 in which the model is generated using DFO-DFO event pairs, with the time between each consecutive DFO-DFO event pair measured by computing the difference between the timestamps of the two events. In some embodiments, event pair time distribution 700 or other similar data representations may be generated corresponding to the application of a model such as a Hidden Markov Model to various event data as discussed previously in process 500 and shown in the exemplary embodiment of FIG. 5.

Event pair time distribution 700 is shown to include a y-axis 710 indicating frequency, as well as an x-axis 720 indicating elapsed time to a next door forced open (DFO) event. With regard to x-axis 720, it should be noted that the x-axis has been log scaled and that the data of event pair time distribution 700 is represented accordingly. Event pair time distribution 700 is further shown to include a first curve 702 indicating behavior of a faulty door (e.g., a door that may be identified/classified as malfunctioning and/or requiring maintenance), as well as a second curve 704 indicating behavior of a normally functioning door (e.g., a door that may not be identified/classified as malfunctioning and/or requiring maintenance). First curve 702, indicating faulty or malfunctioning door behavior, is shown to correspond to data with generally lesser elapsed times between a DFO event and a subsequent DFO event in a DFO-DFO event pair relative to the data corresponding to second curve 704 indicating normal door behavior. That is to say that the doors corresponding to first curve 702 indicating faulty door behavior experience DFO events more frequently, thus indicating that said doors may not be functioning properly. Conversely, second curve 704 indicating normal door behavior is shown to correspond to data with generally greater elapsed times between DFO and DFO events. As such, the greater elapsed time between DFO and DFO events of the data corresponding to second curve 704 indicates that the doors corresponding to second curve 704 are not malfunctioning.

Referring still to FIG. 7, it should be noted that both first curve 702 indicating faulty or malfunctioning door behavior and second curve 704 indicating normal door behavior as shown in the exemplary embodiment of event pair time distribution 700 are logarithmic distribution curves. In alternative embodiments, other distributions and/or curves may be applied. Additionally, it should be noted that area 703 under first curve 702 and area 705 under second curve 704 sum to 1 given the logarithmically scaled x-axis 720. In some embodiments, user/customer data sets may be analyzed to form alternative event pair time distributions similar to event pair time distribution 700. Additionally, event pair time distribution 700 and other similar versions of alternative embodiments may vary according to distributions and scaling applied, as well as the model applied to door data in the analysis of various event time segments as discussed in process 500 and shown in FIG. 5.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A building security system of a building, the building security system comprising one or more memory devices configured to store instructions that, when executed by one or more processors, cause the one or more processors to:
   receive door lock data collected from one or more sensors for one or more doors within the building indicating operation of the one or more doors;
   select a first door from the one or more doors of the building for which the door lock data is collected;
   detect a plurality of event pairs in the door lock data, each event pair comprising a first event occurring at the first door at a first time and a second event occurring at the first door at a second time;
   segment the door lock data into a plurality of segments corresponding to the plurality of event pairs, each segment defining a time interval that elapses between the first event and the second event of the corresponding event pair;
   apply a generated model to the plurality of segments of the door lock data to compute a probability metric for each segment of the plurality of segments of the door lock data based on the time interval that elapses between the first event and the second event of the corresponding event pair;
   compute a combined probability score for the first door based on the probability metrics for each segment of the plurality of segments of the door lock data; and
   classify a function of the first door by comparing the combined probability score to a threshold.

2. The building security system of claim 1, wherein the instructions are configured to cause the one or more processors to classify the first door as normally functioning or malfunctioning by comparing the combined probability score to the threshold.

3. The building security system of claim 1, wherein the instructions are configured to cause the one or more processors to generate an alert indicating that the first door is classified as malfunctioning responsive to the combined probability score exceeding the threshold, wherein the threshold is computed based on at least one of historical system data or user preferences.

4. The building security system of claim 1, wherein the combined probability score is a mean probability score.

5. The building security system of claim 3, wherein different doors of the one or more doors of the building for which data is collected have different thresholds for classification as normally functioning or malfunctioning.

6. The building security system of claim 1, wherein the plurality of segments of the door lock data indicate activity of the first door and the activity of the first door includes door forced open events.

7. The building security system of claim 1, wherein the generated model is a two state model with a first state corresponding to normal functioning behavior of the first door and a second state corresponding to malfunctioning behavior of the first door, wherein the generated model is specific to the first door.

8. The building security system of claim 7, wherein the generated model is a Hidden Markov model.

9. The building security system of claim 1, wherein the door lock data is received from a common database for the one or more doors within the building, the door lock data from a designated time period.

10. The building security system of claim 9, wherein the designated time period for which the door lock data was collected is adjustable and selectable by a user.

11. A method of door lock fault detection, the method comprising:
receiving door lock data collected from one or more sensors for one or more doors within a building indicating operation of the one or more doors;
selecting a period for which the door lock data was collected;
selecting a first door from the one or more doors of the building for which the door lock data is collected;
detecting a plurality of event pairs in the door lock data, each event pair comprising a first event occurring at the first door at a first time and a second event occurring at the first door at a second time;
segmenting the door lock data into a plurality of segments corresponding to the plurality of event pairs, each segment defining a time interval that elapses between the first event and the second event of the corresponding event pair;
applying a generated model to the plurality of segments of the door lock data;
computing a probability metric for each segment of the plurality of segments of the door lock data based on the time interval that elapses between the first event and the second event of the corresponding event pair;
computing a combined probability score for the first door based on the probability metrics for each segment of the plurality of segments of the door lock data, wherein the combined probability score indicates normal function or malfunction of the first door; and
classifying a function of the first door by comparing the combined probability score to a threshold.

12. The method of claim 11, further comprising classifying the function of the first door as normally functioning or malfunctioning by comparing the combined probability score to the threshold and generating a maintenance alert for the first door responsive to the combined probability score exceeding the threshold.

13. The method of claim 11, wherein the threshold is computed based on historical system data or user preferences.

14. The method of claim 13, wherein different doors of the one or more doors of the building for which data is collected have different thresholds for classification as normally functioning or malfunctioning.

15. The method of claim 11, wherein the plurality of segments of the door lock data indicate activity of the first door and the activity of the first door includes door forced open events.

16. The method of claim 11, wherein the generated model is a two state model with a first state corresponding to normal functioning behavior of the first door and second state corresponding to malfunctioning behavior of the first door, wherein the generated model is specific to a selected door.

17. The method of claim 16, wherein the generated model is a Hidden Markov Model.

18. The method of claim 11, wherein the door lock data is received from an access control system comprising a common database for the one or more doors within the building, the door lock data from a designated time period.

19. The method of claim 18, wherein the period for which the door lock data was collected is adjustable and can further be selected by a user.

20. A door lock fault detection system comprising:
one or more non-transitory computer-readable storage media having instructions stored thereon that, when executed by one or more processors, cause the one or more processors to implement operations comprising:
receiving door lock data collected from one or more sensors for one or more doors within a building indicating operation of the one or more doors;
selecting a period for which the door lock data was collected;
selecting a first door from the one or more doors of the building for which the door lock data is collected;
detecting a plurality of event pairs in the door lock data, each event pair comprising a first event occurring at the first door at a first time and a second event occurring at the first door at a second time;
segmenting the door lock data into a plurality of segments corresponding to the plurality of event pairs, each segment defining a time interval that elapses between the first event and the second event of the corresponding event pair;
applying a generated model to the plurality of segments of the door lock data;
computing a probability metric for each segment of the plurality of segments of the door lock data base on the time interval that elapses between the first event and the second event of the corresponding event pair;
computing a combined probability score for the first door based on the probability metrics for each segment of the plurality of segments of the door lock data, wherein the combined probability score indicates normal function or malfunction of the door;
applying a threshold to the combined probability score for the first door to classify the first door as normally functioning responsive to the combined probability score being at or below the threshold and classifying the first door as malfunctioning responsive to the combined probability score being above the threshold; and generating an alert responsive to the combined probability score for the first door being above the threshold.

21. The building security system of claim 1, wherein classifying the function of the first door comprises classifying the function as a security concern, wherein the instructions cause the one or more processors to generate an alert in response to classifying the function of the first door as the security concern.

\* \* \* \* \*